United States Patent
Pelhos et al.

(10) Patent No.: US 7,094,483 B2
(45) Date of Patent: Aug. 22, 2006

(54) MAGNETIC STORAGE MEDIA HAVING TILTED MAGNETIC ANISOTROPY

(75) Inventors: Kalman Pelhos, Pittsburgh, PA (US); Timothy J. Klemmer, Pittsburgh, PA (US); Michael A. Seigler, Pittsburgh, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 10/674,173

(22) Filed: Sep. 29, 2003

(65) Prior Publication Data

US 2004/0115481 A1    Jun. 17, 2004

Related U.S. Application Data

(60) Provisional application No. 60/414,821, filed on Sep. 30, 2002.

(51) Int. Cl.
*G11B 5/66* (2006.01)
*G11B 5/70* (2006.01)

(52) U.S. Cl. .................................... 428/832

(58) Field of Classification Search ......... 428/694 TS, 428/668, 611, 662, 900, 694 TM, 832, 828, 428/836, 836.1
See application file for complete search history.

(56) References Cited

U.S. PATENT DOCUMENTS

| | | | |
|---|---|---|---|
| 4,395,439 A | 7/1983 | Kitamoto et al. | 427/132 |
| 4,426,265 A | 1/1984 | Brunsch et al. | 204/192 M |
| 4,950,548 A | 8/1990 | Furusawa et al. | 428/611 |
| 5,569,523 A * | 10/1996 | Thoma et al. | 428/213 |

| | | |
|---|---|---|
| 2003/0019745 A1 | 1/2003 | Wang et al. |

FOREIGN PATENT DOCUMENTS

| | | |
|---|---|---|
| EP | 05280473 | 2/1995 |
| EP | 08298096 | 10/1996 |
| EP | 06131571 | 12/1996 |
| JP | 2002042326 | 2/2002 |
| WO | WO8007250 | 6/1994 |

OTHER PUBLICATIONS

Eiji Kita, Kimiteru Tagawa, Masafumi Kamikubota and Akira Tasaki; Magnetic recording media prepared by oblique incidence; Nov. 1981; IEEE Transactions on Magnetics, vol. Mag-17, No. 6.
R. Sugita, N. Echigo, K. Tohma and C. Yamamitsu; Incident angle dependence of recording characteristics of vacuum deposited Co-Cr Films; Sep. 1990, IEEE Transactions on Magnetics, vol. 26, No. 5.
J.P.C. Bernards, G.J.P. van Engelen, C.P.G. Schrauwen, H.A.J. Cramer, S.B. Luitjens; Simulation of the recording process with a VSM on Co-Cr and Co-Ni-O layers deposited at oblique incidence; Sep. 1990; IEEE Transactions on Magnetics, vol. 26, No. 5.

(Continued)

*Primary Examiner*—Holly Rickman
(74) *Attorney, Agent, or Firm*—Kinney & Lange, P.A.

(57) ABSTRACT

A magnetic storage media comprises a substrate supporting the layer of magnetic media having a tilted C-axis greater than approximately 25° with respect to surface normal and having a magnetic easy axis tilted at an angle at approximately greater than 30° from the substrate surface normal. The media includes an oblique deposited seedlayer structure directing tilted C-axis growth of the magnetic material layer independent of the angle of deposition of the magnetic material layer. The orientation C-axis and the magnetic easy axis of the media may be organized into circumferential or radial patterns on the substrate surface, and additionally may possess azimuthal symmetry.

25 Claims, 6 Drawing Sheets

OTHER PUBLICATIONS

Ki-Seok Moon and Sung-Chul Shin; Dependence of structural and magnetic properties on deposition angle in electron-beam evaporated Co/Pt multilayer thin films; 1996; American Institute of Physics.

Yung-Chieh Hsieh and Sergei Gadetsky; Takao Suzuki; M. Mansuripur; Oblique sputtering of amorphous TbFeCo thin films on glass substrates and the effect of deposition angle on perpendicular magnetic anisotropy; 1997; American Institute of Physics.

R. D. McMichael; C. G. Lee; J. E. Bonevich, P. J. Chen, W. Miller, and W. F. Egelhoff, Jr.; Strong anisotropy in thin magnetic films deposited on obliquely sputtered Ta underlayers; Nov. 1, 2000; Journal of Applied Physics vol. 88, No. 9.

M.J. Hadley, R. Atkinson, R.J. Pollard; Magnetic properties of Co films deposited onto obliquely sputtered Ta underlayers; 2002; Elsevier Science B.V.

M. Cartier, S. Auffret, P. Bayle-Guillemaud, F. Ernult, F. Fettar, and B. Dieny; Influence of deposition angle on the properties of NiO spin-valves; Feb. 1, 2002; American Institute of Physics.

U. F. Zheng and J. P. Wang; Control of the tilted orientation of CoCrPt/Ti thin film media by collimated sputtering; May 15, 2002; American Institute of Physics.

A. Lisfi, J. C. Lodder, H. Wormeester, and B. Poelsema; Reorientation of magnetic anisotropy in obliquely sputtered metallic thin films; 2002; The American Physical Society Physical Review B 66, 174420 (2002).

Anup G. Roy and David E. Laughlin; Effect of seed layers in improving the crystallographic texture of CoCrPt perpendicular recording media; May 15, 2002; Journal of Applied Physics; vol. 91, No. 10.

Kiwamu Tanahashi, Yuzuru Hosoe, Masaaki Futamoto; *Magnetic Anisotropy and Microstructure of Obliquely Evaporated Co/Cr Thin Films;* Jul. 24, 1995; pp. 265-272.

Y.F. Zheng and J.P. Wang; *Control of the Tilted Orientation of CoCrPt/Ti thin film media by collimated sputtering;* May 15, 2002; V931 pp. 0007-0009.

M.J. Hadley, R. Atkinson, R.J. Pollard; *Magnetic Properties of Co Films Deposited Onto Obliquely Sputtered Ta Underlayers;* Jan. 31, 2002.

Dieter Weller and Andreas Moser; *Thermal Effect Limits in Ultrahigh-Density Magnetic Recording;* Nov. 1999; vol. 35, pp. 4423-4439.

R.D. McMichael, C.G. Lee, J.E. Bonevich, P.J. Chen, W. Miller, and W.F. Egelhoff, Jr; *Strong Anisotropy in Thin Magnetic Films Deposited on Obliquely Sputtered Ta Underlayers;* vol. 88, No. 9, pp. 5296-5299.0.

A. Hagemeyer, H.J. Richter, H. Hibst, V. Maier and L. Marosi; *Crystallographic Texture and Morphology of Obliquely Deposited Co-Cr Magnetic Thin Films on Flexible Polymeric Substrates;* Aug. 10, 1993; pp. 199-202.

T. Hikosaka, Y. Tamaka, T. Sonoda, and R. Nishikawa; *Cr Underlayer's Effect on the Magnetic and Crystalline Properties of Co Alloy Film;* Jun. 1988; vol. 3, No. 6, pp. 423-424.

J.C. Lodder; *Magnetic Thin Films for High-Density Recording*: 1996; pp. 474-483.

PCT/US03/30489, *Notification of Transmittal of the International Search Report or the Declaration,* Aug. 2004, pp. 1-3.

PCT/US03/30489, *International Search Report,* Aug. 2004, pp. 1-4.

McMichael et al., *Strong Anisotropy in Thin Magnetic Films Deposited on Obliquely Sputtered Ta Underlayers,* Nov. 2000, pp. 5296-5299.

\* cited by examiner

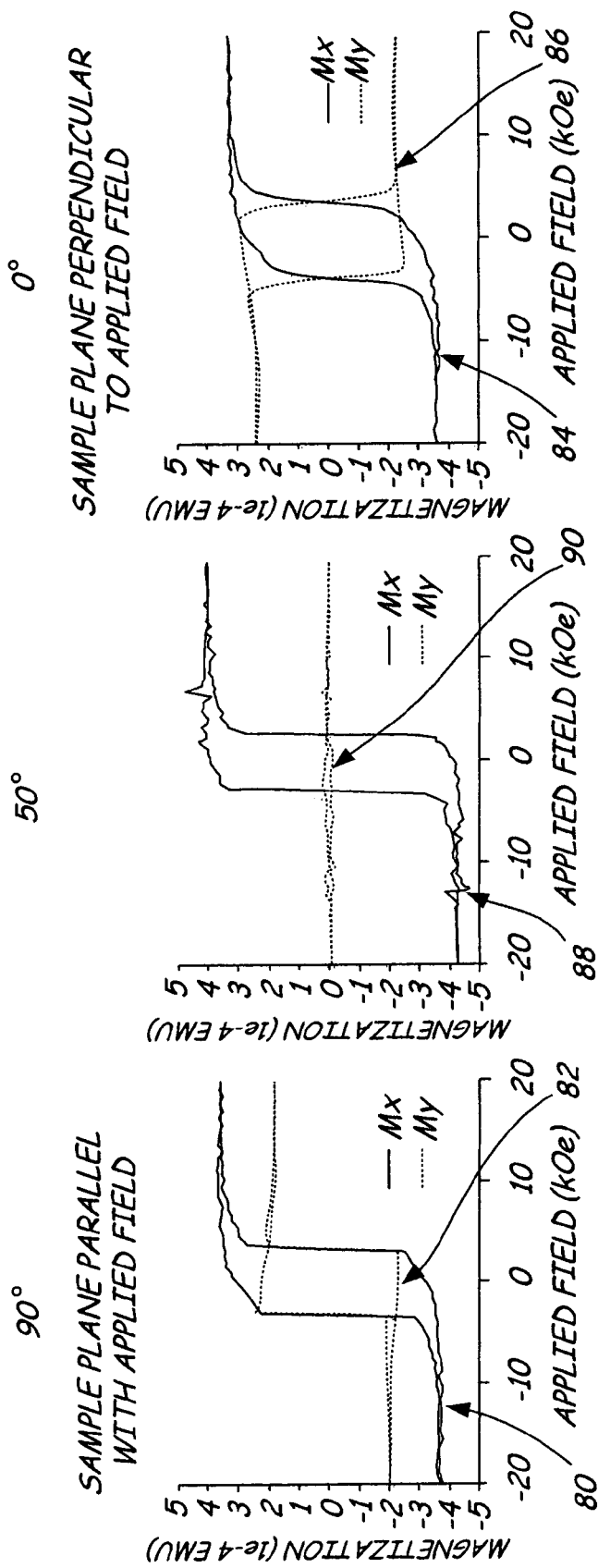

MAGNETIC STORAGE MEDIA HAVING TILTED MAGNETIC ANISOTROPY

CROSS-REFERENCE TO RELATED APPLICATION(S)

This application claims priority from U.S. Provisional Patent Application No. 60/414,821 filed on Sep. 30, 2002 for "Method Fabricating Magnetic Storage Media Having Tilted Anisotropy". The present application is related to concurrently filed applications: Ser. No . 10/673,795, "System, Method and Aperture for Oblique Deposition"; and Ser. No. 10/673,746, "System, Method and Collimator for Oblique Deposition".

BACKGROUND OF THE INVENTION

1. Field of the Invention

The present invention relates generally to the field of magnetic data storage. In particular, the present invention relates to a thin film media having a tilted magnetic anisotropy for use in magnetic recording.

2. Description of the Relevant Art

Demands are currently being made to further increase the capacity of magnetic data storage. A major objective of research efforts in thin film magnetic materials is to make recording media with properties, which are suitable for recording at higher data densities. Achievement of higher recording densities is impaired by several problems. First, as the quantity of magnetic flux corresponding to the data becomes smaller, it becomes increasingly difficult to separate the data signal from the noise. Second, as the recording density increases without corresponding improvement in the materials, the super-paramagnetic limit of the materials is approached so that thermal energy can potentially randomize the data stored in the magnetic material. Both of these problems are related to the energy density associated with the magnetic anisotropy of the magnetic material, commonly quantified by the constant $K_u$ for a particular material. Materials with higher $K_u$ values are desired for recording media to avoid the problems above.

In materials with larger $K_u$ values, the property of media coercivity ($H_c$) is also generally increased. Increased coercivity of the magnetic media in turn requires larger write field strength to be generated by the recording heads. The higher the coercivity the higher the required write field strength and hence the more difficult it is to successfully record data in the magnetic material.

A method proposed to overcome the problems of high write field strength requirements to write high $K_u$ materials is to tilt the magnetization away from the surface normal in perpendicular recording or from the surface plane in longitudinal recording. For this proposal, media must be created where the angle between the direction of preferred magnetization (magnetic easy axis) and the surface normal falls between 0° (perpendicular media) and 90° (longitudinal media), also referred to as tilted media. Many attempts have been made to produce tilted media without success.

Several attempts to achieve a tilted media involved the processes of oblique deposition. Oblique deposition is defined as a deposition geometry where a beam of atoms or particles impinges upon the surface of a wafer at a defined angle. The angle is generally measured with respect to the surface normal. Oblique deposition of almost any magnetic material or deposition of a magnetic material onto any oblique deposited seedlayer will give some minimal degree of magnetic uniaxial reorientation likely due to either shape anisotropy, stress anisotropy or a combination of the two. Shape anisotropy and stress anisotropy are not intrinsic properties of the material. Shape anisotropy is due to a geometrically induced directional dependency of the demagnetization field within the material. Stress anisotropy is attributed to external physical forces compressing or stretching the material. However, shape anisotropy and stress anisotropy are both weak and thus the previous attempts have failed to produce tilted magnetic anisotropy greater than a few degrees.

The use of conventional underlayers or seedlayers with oblique deposition to achieve tilted media has been attempted. For example, an underlayer may be oblique sputter deposited producing a corrugated surface for deposition of additional media layers. These conventional structures rely primarily on combinations of shape and stress anisotropy arising from the elongated shape of the grains or uneven surfaces of a seedlayer to provide tilted magnetic anisotropy of only a few degrees. Additionally, the magnetic anisotropy is frequently limited to narrow ranges of layer thicknesses because stresses and structures within the material vary with the thickness of the deposited material. Consequently, there remains a need in the art for a magnetic media with a tilted magnetic anisotropy that is both of large enough degree and consistently controlled so as to be suitable for use in high-density recording.

BRIEF SUMMARY OF THE INVENTION

The magnetic media of the present invention possesses a tilted magnetic anisotropy of at least approximately 25° with respect to a surface normal. The tilt in magnetic anisotropy is achieved in the present invention through control of C-axis orientation of the material creating magnetocrystalline anisotropy. The tilted magnetic anisotropy of the present invention is not primarily dependent on shape anisotropy resulting from tilted elongated grains. The growth of magnetic media with a tilted crystalline structure greater than approximately 10°, resulting in controlled tilted magnetocrystalline anisotropy, has not been successfully demonstrated before on a rigid disc.

As is taught in the present invention, it is necessary to use a suitably designed seedlayer structure comprising a single seedlayer or combination of seedlayers to promote the desired crystalline growth in the subsequently deposited magnetic material layer. The construction of the seedlayer structure is critical to the resulting control of tilted magnetic anisotropy in the magnetic material layer. Oblique deposition of the seedlayer structure serves to initiate tilted columnar growth. The columnar growth includes the columnar shape of the grains for polycrystalline materials, and may also refer to amorphous and some crystalline materials where the columns are defined as less dense material surrounding more dense material. Oblique deposition also may serve to initiate growth with preferred tilted crystallographic orientations in specific portions of the seedlayer structure. Preferred crystallographic orientations may also be referred to as crystallographic texture.

The magnetic material layer may be deposited on the seedlayer structure either by oblique deposition techniques or conventional deposition techniques. Consequently, the magnetic material layer may possess either a perpendicular or a tilted grain structure. In either case both the C-axis and magnetic anisotropic axis have controlled directionality and are tilted at least 25° from the surface normal. For example, it has been found that the well-engineered oblique deposited seedlayers of the present invention can promote tilted C-axis growth and a tilted uniaxial magnetic anisotropy in the magnetic material layer even when the magnetic material layer itself is not oblique deposited.

It is important to note that oblique deposition of magnetic materials without proper seedlayer structure will not successfully induce the tilted C-axis or tilted magnetic anisotropy of the present invention. Conventional techniques of simply depositing magnetic materials oblique at high angles did not succeed in achieving the present media. Furthermore, the tilted magnetic anisotropy of the inventive magnetic media is not highly dependent on the deposition process used to form the magnetic material layer.

BRIEF DESCRIPTION OF THE DRAWINGS

FIG. 9a–9c is a graphical representation of M-H loops for sample media A.

DETAILED DESCRIPTION

The present invention is described with reference to example data storage devices but is not limited to those devices. The present invention may have additional applicability to other data storage devices or alternative technologies not described herein.

Figure 1:
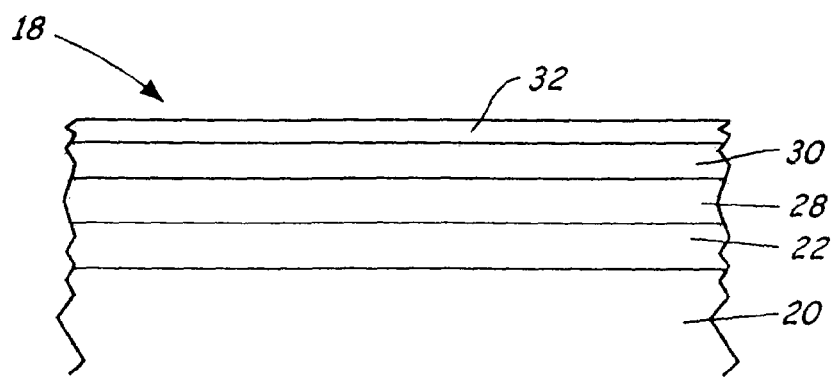
FIG. 1 is a cross-sectional view of a typical thin film media consistent with the present invention.

A cross-sectional portion of magnetic media 18 consistent with the present invention is shown in FIG. 1. Magnetic media 18 comprises substrate 20, seedlayer structure 22, magnetic material layer 28, protective overcoat 30 and lubricant 32.

A wide variety of materials may be used for substrate 20. For use in rigid thin film recording media (e.g. hard discs), substrate 20 does not require special preparation. Substrate 20 may be well polished and extremely smooth, as commonly used for production of conventional recording media, but a polished, smooth surface is not required. Examples of suitable materials for substrate 20 include silicon wafers, glass discs and aluminum substrates. The substrate 20 will typically be circular, especially in hard disc applications; but no particular shape is required.

Seedlayer structure 22 has three roles necessary to achieve the desired tilt in subsequently deposited magnetic material layer 28. First, seedlayer structure 22 must be able to establish tilted columnar growth on substrate 20. Second, seedlayer structure 22 must create tilted crystallographic texture. Third, seedlayer structure 22 must promote local epitaxial growth of the magnetic material layer 28. These properties are not necessarily present within or throughout seedlayer structure 22. These roles describe influences asserted by seedlayer structure 22 as a whole on magnetic material layer 28 and/or within the seedlayer structure 22 itself. The roles are further described below.

Seedlayer structure 22 may be formed of a single layer of a single material, several layers of materials, or a single layer of continuously changing material composition. Seedlayer structure 22 is formed by oblique deposition. Alternatively, seedlayer structure 22 is formed using a combination of oblique and non-oblique deposition where at least one layer or a portion of a layer of seed layer structure 22 is oblique deposited.

The material of seedlayer structure 22 develops tilted columnar growth, for example tilted grains, when deposited on substrate 20. The material for seedlayer structure 22 should be adaptable to a variety of substrate surfaces because it acts as a buffer material between substrate 20 and the growing or developing tilted grain structure of seedlayer structure 22. Generally, the tilted columnar growth will be the result of oblique deposition.

An additional requirement for seedlayer structure 22 is to create tilted crystallographic texture. The tilted crystallographic texture of seedlayer structure 22 does not require uniaxial symmetry or a single high symmetry axis. Seedlayer structure 22 must create a tilted crystallographic template for magnetic material layer 28 by presenting preferred, tilted crystallographic orientations at the interface 23 with magnetic material layer 28.

The materials for seedlayer structure 22 are chosen so that the desired crystalline properties created by seedlayer structure 22 are carried into the subsequently deposited layers, both within seedlayer structure 22 and/or separate from seedlayer structure 22. For example, seedlayer structure 22 must have sufficient crystal lattice matching with the magnetic material layer 28 at interface 23 that epitaxy occurs during growth of magnetic material layer 28. Seedlayer structure 22 must provide an epitaxial growth template for the subsequently deposited magnetic material layer 28.

The thickness of seedlayer structure 22 may be as high as 1000 Å. Preferably the thickness of seedlayer structure 22 will be less than 1000 Å. The thickness of seedlayer structure 22 preferably falls within the range of 25 Å to 400 Å without significant variation in the desired material characteristics of seedlayer structure 22.

The magnetic material layer 28 is directly deposited onto seedlayer structure 22. Magnetic material layer 28 is formed of high coercivity materials that also possess a uniaxial symmetry. In materials with a single preferred crystalline axis, the magnetic easy axis tends to align with the C-axis creating magnetocrystalline anisotropy. Magnetocrystalline anisotropy is an intrinsic property of the material where the magnetization favors preferred directions (easy axis/or axes) oriented along the crystalline symmetry axes, primarily due to spin orbit coupling. The magnetic material layer 28 has a C-axis tilted greater than approximately 10°, preferably approximately tilted 25° to 55° as measured from a surface normal. The magnetic material layer 28 also has uniaxial magnetic anisotropy tilted greater than approximately 25°, preferably approximately tilted 30° to 60° as measured from a surface normal. Suitable example crystalline structures with uniaxial symmetry include, but are not limited to: hexagonally close-packed unit cell (hcp), tetragonal, orthorhombic, $L1_0$, and some multilayer films.

The coercivity of the magnetic material along the easy axis should be greater than about 2,000 oersteds (Oe) and preferably above 5,000 Oe. As previously discussed, higher coercivity materials allow the use of smaller grain structures without suffering thermal instability problems. The magnetic media of the present invention may allow the use of higher coercivity materials that have previously not been commonly used due to limitations in write field strength. The use of these much higher coercivity materials carries the added benefit of being more thermally stable over prior media materials.

Figure 2:
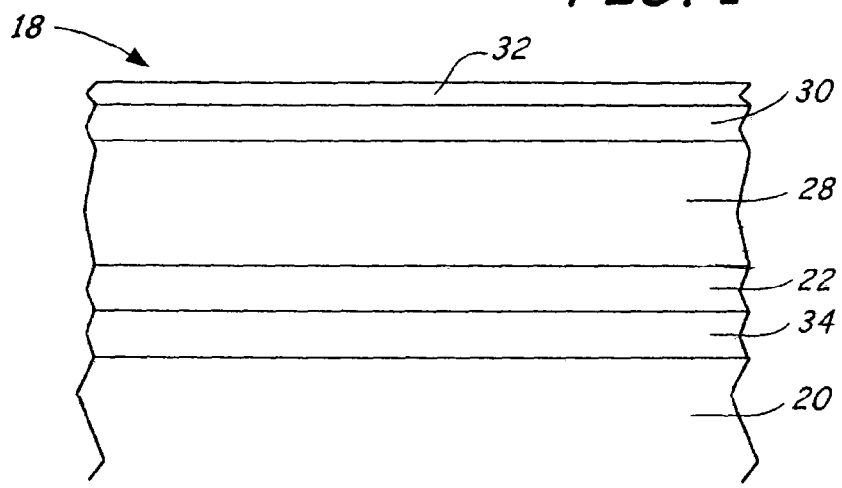
FIG. 2 is a cross-sectional view of an embodiment of a typical thin film media consistent with the present invention.

A second example of magnetic media consistent with the present invention additionally incorporates a soft underlayer as shown in FIG. 2. In the second example, including an optional additional underlayer of a magnetically soft material 34 (commonly referred to as SUL), seedlayer structure 22 should be as thin as possible with a lower limit of approximately 5 Å. SUL 34 is typically placed between, but not necessarily immediately adjacent to substrate 20 and magnetic material layer 28. In FIG. 2, SUL 34 is layered on substrate 20 followed by seedlayer structure 22, magnetic material layer 28, protective overcoat 30 and lubricant 32. SUL 34 may be a separate layer or may function as part of seedlayer structure 22.

Figure 3:
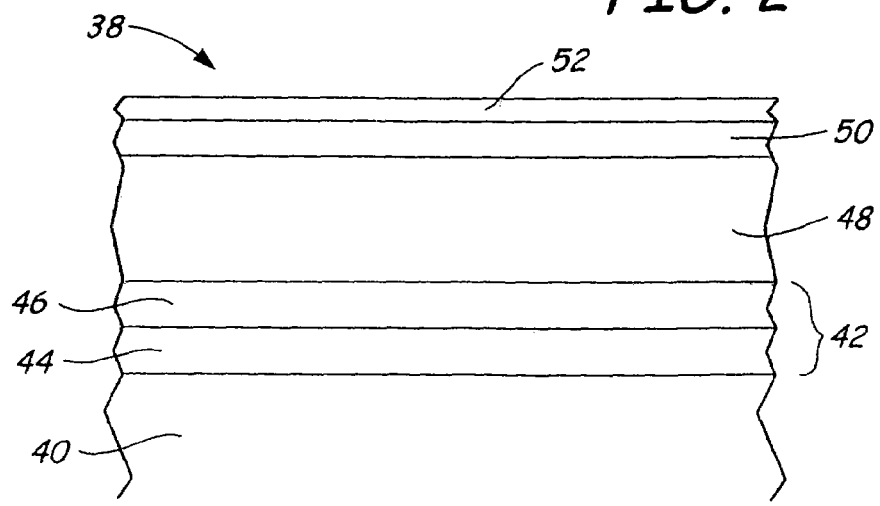
FIG. 3 is a cross-sectional view of example media produced according to the present invention.

A third example of magnetic media consistent with the present invention is shown in FIG. 3. The third example is an example magnetic media where seedlayer structure 42 is formed from two layers of materials. A cross-sectional view of magnetic media 38 includes substrate 40 supporting a seedlayer structure 42 that includes first seedlayer 44 and second seedlayer 46. Following the deposition of seedlayer structure 42, are magnetic material layer 48, protective overcoat 50 and lubricant 52.

As described above, substrate 40 may include silicon wafers, glass discs and aluminum substrates, which do not require special preparation. Protective overcoat 50 and lubricant 52 are also consistent with similar layers in conventional magnetic media. Furthermore, as previously described, this third embodiment may also include additional layers, including an SUL, which are not described below.

Seedlayer structure 42 includes a first seedlayer 44 formed on substrate 40. First seedlayer 44 is chosen for its ability to grow tilted columns when oblique deposited and promote tilted grain growth in subsequently deposited materials. Additionally, the material for first seedlayer 44 should be adaptable to a variety of substrate surfaces because it acts as a buffer material between substrate 40 and the growing tilted grain structure. Example materials that are capable of growing with tilted columnar structure include NiFeCr, NiFe and Ta. While these materials demonstrate columnar growth when obliquely deposited, they are not necessarily uniaxial. For example, Ta will grow tilted columns when oblique deposited, but is not a uniaxial material and consequently will not have a strongly preferred orientation in terms of crystallographic texture, whether the columns are tilted or non-tilted.

The fabrication of the inventive magnetic media requires a deposition system capable of depositing species (atoms, molecules, particles, clusters, etc.) in a well-collimated manner where oblique deposition is required. In general, where oblique deposition is required, a deposition angle (oblique angle) greater than 45° from surface normal is needed. The oblique angle is at least approximately 35° to at most approximately 90°. Preferably oblique angle θ is between approximately 55° to approximately 75°. An example preferred angle is approximately 65°. It is desired that the deposition method provide a beam of species or multiple beams of species where the full width at half max (FWHM) of the distribution angles of incidence is less than approximately 30°, preferably less than 10°. In addition, the deposition system must achieve very high deposition angles for oblique deposition. Suitable systems for oblique deposition include ion beam deposition (IBD), sputtering, molecular beam epitaxy (MBE), laser ablation and evaporation.

First seedlayer 44 is oblique deposited at an angle chosen from the range of approximately between 45° to 75° from surface normal. The thickness of first seedlayer 44 may be as high as 500 Å, but is preferably in the range of 25 to 200 Å. The inventive media has demonstrated consistent performance over seedlayer thicknesses within that range. As described above, if an SUL is added to the media, thinner seedlayers are preferred to a minimum thickness of approximately 5 Å.

Second seedlayer 46 is used to continue the growth of tilted grains while improving the texture to create a tilted crystalline structure, preferably with a tilted high symmetry crystalline axis. An additional characteristic required for the material of second seedlayer 46, or the portion of seedlayer structure 42 that contacts magnetic material layer 48, is the ability to promote epitaxial growth of subsequently deposited magnetic material layer 48. In other words, the C-axis of magnetic material layer 48 aligns with a high symmetry axis of second seedlayer 46.

Second seedlayer 46 is deposited on first seedlayer 44. Second seedlayer 46 is at least partially deposited by oblique deposition methods. The layer thickness may be as high as 500 Å but is preferably in the range of 25 to 200 Å. As described above, if an SUL is added to the media, thinner seedlayers are preferred to a minimum thickness of approximately 5 Å.

One suitable material for second seedlayer 46 is Ru. Ruthenium is a hexagonally close-packed material with inherent uniaxial orientation of its crystal structure. This allows for tighter control and makes it easier to promote crystallographic orientation in magnetic material layer 48 because there is only one preferred orientation for the C-axis. This material tends to grow with very well-defined crystalline texture and possesses a high symmetry axis so that, for example, when deposited onto the first seedlayer 44, the Ru second seedlayer 46 grows continuing the tilted columnar growth of a Ta first seedlayer 44 while adopting preferred crystallographic orientations such that the grains share a well-defined C-axis within the Ru second seedlayer 46.

Suitable materials for magnetic material layer 48 include Co-alloy media such as CoCr, CoPt, CoPtCr, $CoPt+O_2$, $CoPt+Sio_2$ and other media types suitable for use in conventional perpendicular recording materials. The key characteristics include a uniaxial crystalline symmetry, such as seen with hcp type crystals, and a high coercivity, preferably greater than about 2,000 oersteds (Oe) and more preferably above 5,000 Oe. The uniaxial crystalline symmetry of the materials allows growth of the crystals with a well-defined C-axis. A well-defined C-axis is described as a concerted directional orientation of the C-axis throughout the magnetic material layer. The better defined an axis, the smaller the angular distribution of axis orientations are relative to a reference axis, typically a surface normal.

The benefit of uniaxial type magnetic materials is that the magnetic anisotropy aligns with the C-axis. Other materials with body centered cubic (bcc) and face centered cubic (fcc) materials have multiple axes of symmetry and consequently multiple easy axes impairing the control of magnetic anisotropy by crystal structure. The use of uniaxial materials allows control of the C-axis and the easy axis of the magnetic material layer. In the inventive media, when the C-axis is better defined, the easy axis of the magnetic material layer is also better defined thereby minimizing the FWHM of the magnetic media.

Magnetic material layer 48 may be deposited either by oblique deposition or any other conventional non-oblique deposition techniques onto second seedlayer 46. Magnetic material layer 48 has a thickness from approximately 20 Å to approximately 400 Å. Typical thicknesses for magnetic material layer 48 are approximately from 100 Å to 150 Å. Two samples of magnetic media consistent with the present invention and with the layered structure of the third example are demonstrated below. In sample media A, the magnetic material layer is oblique deposited. The sample media B includes a magnetic material layer deposited by a non-oblique method.

Figure 4:
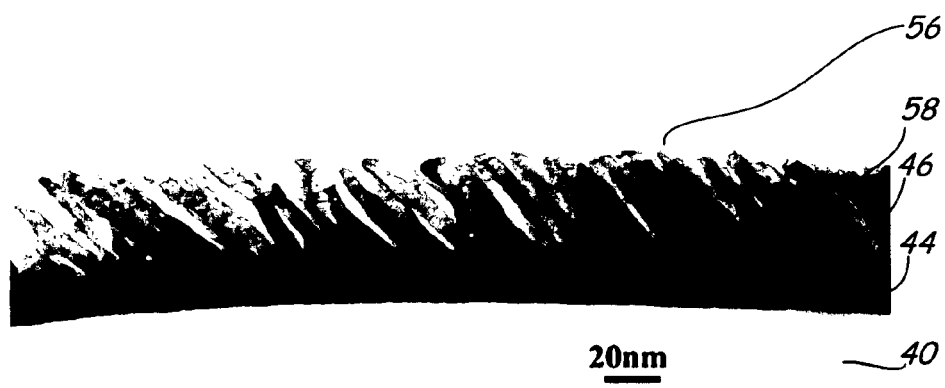
FIG. 4 is a cross-sectional Transmission Electron Microscopy (TEM) image of tilted media produced according to sample media A of the present invention.
Figure 5:
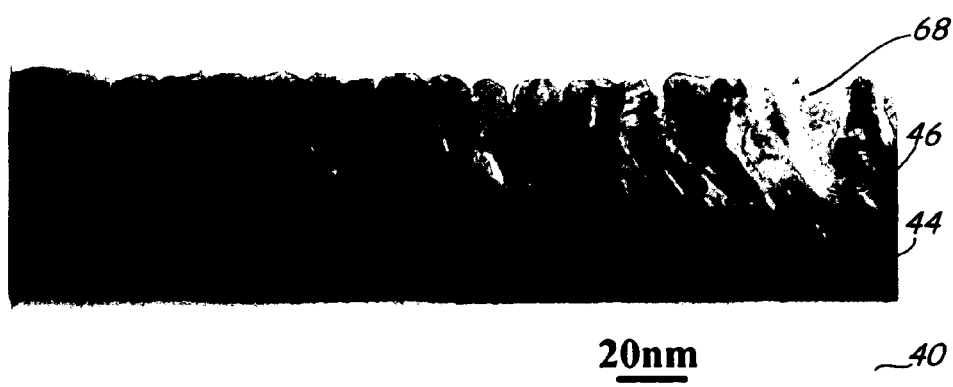
FIG. 5 is a cross-sectional Transmission Electron Microscopy (TEM) image of tilted media produced according to sample media B of the present invention.

FIGS. 4 and 5 show Transmission Electron Microscopy (TEM) cross-sectional images of sample media A and sample media B of the present invention. The sample media differ substantially only in the method of deposition of magnetic material layer 48 of the third example. Oblique deposition was used for the magnetic material layer 58 in sample media A, while non-oblique deposition was used for the magnetic material layer 68 in sample media B. Additionally, a third sample media C (not shown by TEM) was prepared for purposes of comparison without using oblique deposition of the materials comprising the seedlayer structure 42 or magnetic material layer 48. An ion beam deposition (IBD) system was used to manufacture sample media A and B. In the IBD system, deposition angles as high as 70° from surface normal are achievable.

A cross-section of sample media A by TEM is shown in FIG. 4. Sample media A is formed of first seedlayer 44 of Ta onto substrate 40. The Ta was oblique deposited at 65°. Second seedlayer 46 is formed of oblique deposited Ru, deposited at 65° with the same orientation of oblique deposition as first seedlayer 44. Magnetic material layer 58 of CoPtCr was also oblique deposited at 65° and in the same orientation as second seedlayer 46. In sample media A, all three layers (the first and second seedlayers 42, 46 and magnetic material layer 58) are nominally 20 nanometers (200 Å) thick. Deposition of the layers at this thickness allows for ready viewing of the collimated grain by TEM and for easily approximating material boundaries. However, deposition at these thicknesses is not necessary for functionality of the media.

In FIG. 4, all three layers clearly display grains growing at an angle of approximately 40° to 45° from an axis perpendicular to the substrate surface (surface normal). In media of this type, ideally each column 56 is a single grain and each grain is a single hcp crystal, however this is not required. There are two disadvantages to tilted grains in the magnetic material layer 58: (1) the uneven surface of the magnetic material layer 58; and (2) the cross-section of each grain parallel to the substrate surface is an oval due to the grain tilt. The ovular cross-section creates what is effectively a larger apparent grain size. Therefore, it is more desirable to have perpendicular grains while preserving the tilted crystallographic texture.

Sample media B differs from sample media A in that magnetic material layer 68 is not oblique deposited, resulting in grain growth perpendicular relative to the substrate surface as shown in the electron micrograph of FIG. 5. Sample media B of FIG. 5 has first seedlayer 44 of Ta deposited onto substrate 40. The Ta seedlayer is followed by a second seedlayer 46 of Ru. The first seedlayer 44 is oblique deposited at 65°. Second seedlayer 46 of Ru is also oblique deposited in the same directionality as first seedlayer 44 at an angle of 65° from normal. In contrast to sample media A, magnetic material layer 68 of sample media B is not oblique deposited. One method for non-oblique deposition is to rotate the wafer during the deposition of the magnetic material layer 68. The magnetic material layer 68 is formed of CoPtCr. As shown in FIG. 5, the magnetic material layer 68 shows perpendicular grain growth. Sample media B shown in FIG. 5 uses three equal layer thicknesses of 20 nanometers (200 Å), similar to sample media A. As with sample media A, layers at that thickness are not required and as previously discussed are preferably thinner. For example, first seedlayer 44 with a thickness of 25 Å, second seedlayer 46 with a thickness of 5 Å and magnetic material layer 68 with a thickness of 50 Å are also suitable for magnetic media consistent with the present invention.

Figure 6:
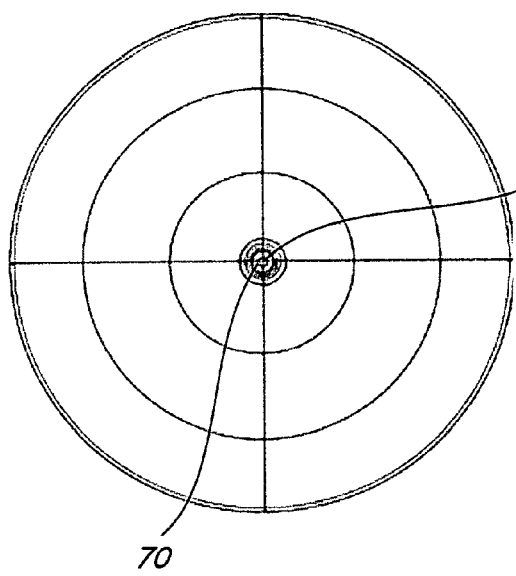
FIG. 6 is a polar XRD plot for sample media C.
Figure 7:
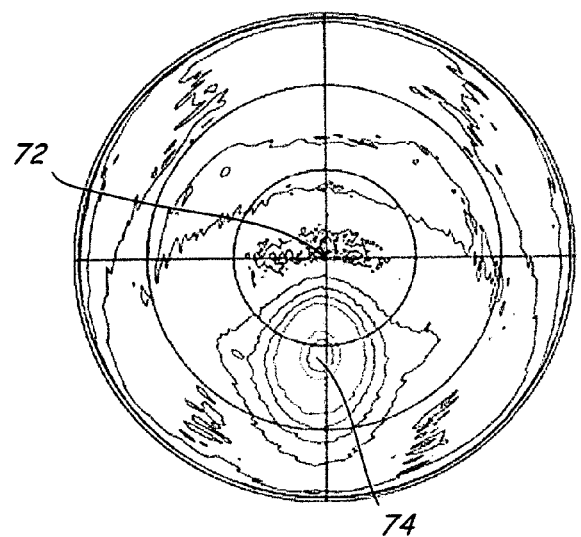
FIG. 7 is a polar XRD plot for sample media A.
Figure 8:
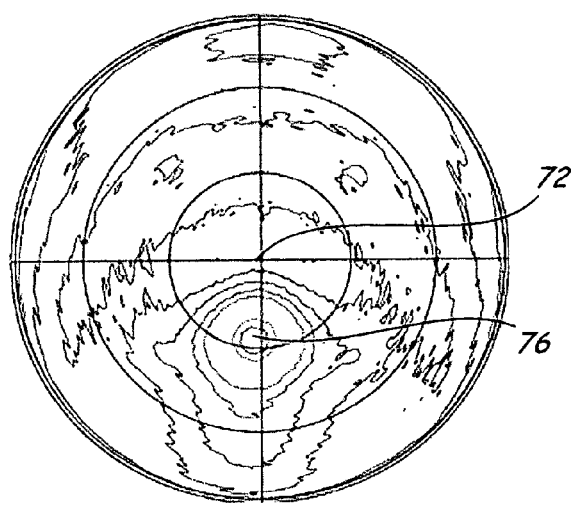
FIG. 8 is a polar XRD plot for sample media B.

X-Ray Diffraction (XRD) data, presented in FIGS. 6, 7 and 8, demonstrate that sample media A and sample media B both result in a tilting of the C-axis in the magnetic material layer, despite the different methods used to deposit magnetic material layers 58 and 68 respectively. The XRD "pole figure" technique presented on these graphs is capable of resolving the orientation of a specific crystallographic direction with respect to the sample normal. For comparison a control media was produced where the same layers and composition were used but all layers, seedlayers, and magnetic material layer, were non-oblique deposited. In FIG. 6, the XRD data for the control media shows peak intensity contour lines, which correspond to the C-axis orientation 70 centered around the graph origin 72, indicating perpendicular or normal growth. In FIG. 7, showing XRD data for sample media A, the C-axis peak contour lines 74 are shifted off of graph origin 72 indicating a tilting of the C-axis by 33° in sample media A. The XRD data shown in FIG. 8 for sample media B, shows the C-axis peak contour lines 76 shifted off of graph origin 72, indicating a tilting of the C-axis by 28° in sample media B. The XRD data for sample media B shown in FIG. 8 is of special interest because the CoPtCr layer was non-oblique deposited. In the non-oblique deposited magnetic material layer 68 of sample media B, the grains are perpendicular and yet the resulting C-axis is tilted to 28° from the surface normal.

The orientation of the magnetic anisotropy of the inventive magnetic media was confirmed to tilt at approximately 50° with respect to the surface normal in both sample media A and sample media B. When a material with uniaxial magnetocrystalline anisotropy is polarized at an angle $\theta$ relative to its easy axis, the anisotropy energy density minima occur at $\theta=0°$ and $\theta=180°$. In an M-H loop analysis of a material with uniaxial magnetocrystalline anisotropy, where the specimen is initially magnetized along its easy axis at $\theta=0°$, the plot has the form of a square loop. Therefore, materials with uniaxial magnetocrystalline anisotropy where the easy axis is aligned are described as having a high degree of squareness.

A vibrating sample magnetometer (VSM) was used to measure sample magnetization versus applied magnetic field loops (M-H loops) as a function of the angle between the sample normal and the applied magnetic field. The results are shown in FIGS. 9a–9c and 10a–10c. The M-H loops for each sample media are measured both parallel to the applied magnetic field and perpendicular to the applied magnetic field.

FIGS. 9a–9c shows VSM data for sample media A where the magnetic layer was deposited oblique. The data in FIG. 9a show hysteresis in $M_x$ loop 80 and $M_y$ loop 82 when the sample plane is parallel with the applied field. When the sample plane is parallel to the applied field, the angle between the sample normal and the applied magnetic field is 90°. The hysteresis in both $M_x$ loop 80 and $M_y$ loop 82 indicates that the easy axis of magnetic material layer 58 does not lie in the plane of magnetic material layer 58.

Similar results are seen in FIG. 9c, where the sample plane is oriented perpendicular to the applied field. When the sample plane is perpendicular to the applied field, the angle between the sample normal and the applied magnetic field is 0°. The hysteresis in both $M_x$ loop 84 and $M_y$ loop 86 indicates that the easy axis of magnetic material layer 58 does not lie perpendicular to the plane of magnetic material layer 58.

The high squareness of $M_x$ loop 88 and vanishing $M_y$ loop 90 shown in FIG. 9b demonstrate the anisotropy energy minima present when the easy axis is aligned with the applied field. $M_x$ loop 88 and $M_y$ loop 90 of FIG. 9b show that the easy axis (the magnetic anisotropy) of magnetic material layer 58 is tilted approximately 50° away from the sample surface normal. The degree of tilt of the magnetic anisotropy with respect to the surface normal is larger than the degree of tilt of the C-axis due to the demagnetization torque pulling the magnetization into the plane of the thin film.

Figures 10A, 10B, 10C:
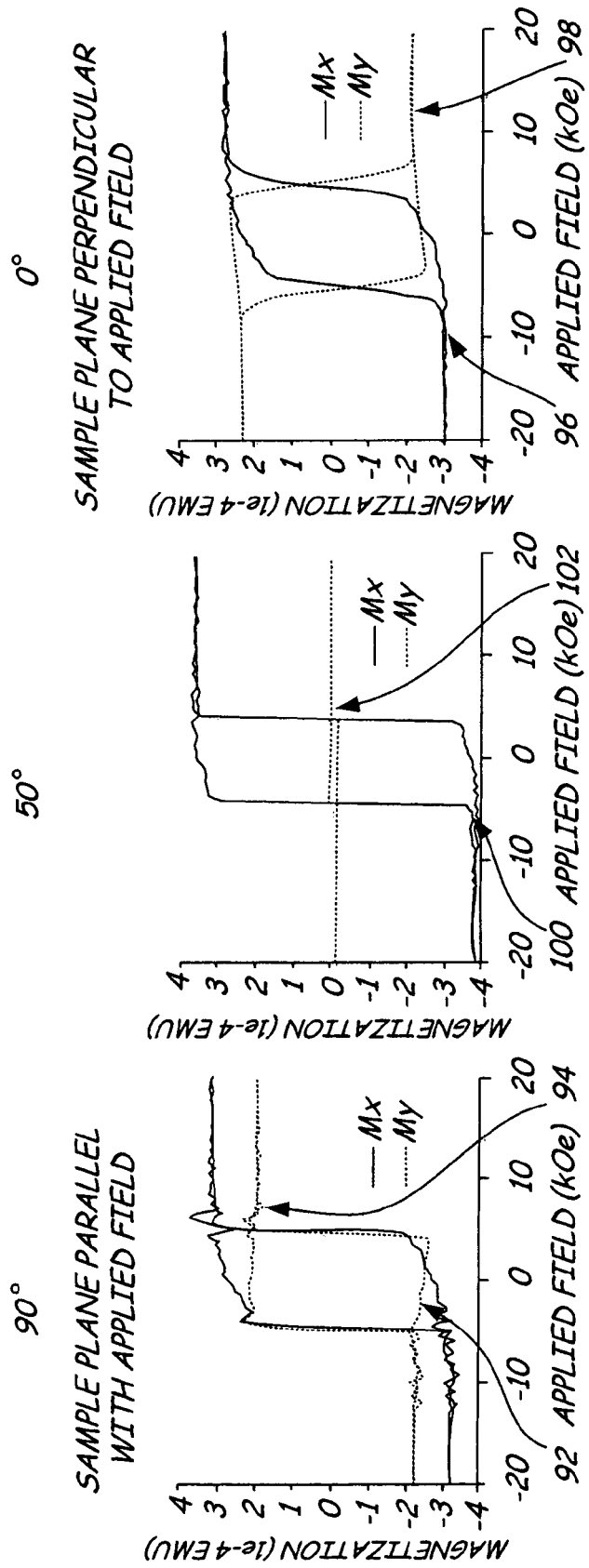
FIG. 10a–10c is a graphical representation of M-H loops for sample media B.

FIGS. 10a–10c show similar VSM data for sample media B where the Ta and Ru seedlayers are oblique deposited but the magnetic material layer 68 of CoPtCr is deposited non-oblique. The data in FIG. 10a show hysteresis in $M_x$ loop 92 and $M_y$ loop 94 when the sample plane is parallel with the applied field, indicating that the easy axis of magnetic material layer 68 does not lie in the plane of the media. In FIG. 10c, where the sample plane is oriented perpendicular to the applied field, the hysteresis in both $M_x$ loop 96 and $M_y$ loop 98 indicates that the easy axis of magnetic material layer 68 does not lie perpendicular to the plane of the media.

The same approximately 50° tilt in magnetic anisotropy is observed for sample media B where magnetic material layer 68 is non-oblique deposited. $M_x$ loop 100 and $M_y$ loop 102 of FIG. 10b show that the easy axis (the magnetic anisotropy) of magnetic material layer 68 is tilted approximately 50° away from the sample surface normal as evidenced by the high squareness of $M_x$ loop 100 and vanishing $M_y$ loop 102.

In summary, the magnetic storage media of the present invention with magnetic anisotropy tilted away from the surface normal is achieved if a tilted seedlayer structure of a single seedlayer or combination of seedlayers is used where the seedlayer structure satisfies two criteria: the seedlayer structure forms a highly textured film of tilted grains and the seedlayer structure provides a suitable template for epitaxial growth of the magnetic material layer. A combination of seedlayers may be needed to achieve this goal.

The oblique deposition technique used for the seedlayer structure in order to achieve the highly textured film of tilted grains and suitable template for epitaxial growth of the magnetic material layer must be capable of material deposition at a well defined angle with respect to the surface normal. A well-defined angle for the present invention means an FWHM angular spread of 30° or less, and recording properties are expected to improve with decreasing FWHM. A well-defined angle may be achieved by using a deposition technique that provides a well-collimated deposition, for example IBD. In addition, high deposition angles greater than or equal to 45° from surface normal are generally required. By using the appropriate oblique deposited seedlayer structure as described in the present invention, a magnetic media with a tilted magnetic anisotropy can be achieved with either perpendicular grain growth of the magnetic material layer or tilted grain growth of the magnetic material layer. Theoretically, the resulting magnetic anisotropy tilt of the inventive media may give an approximately 50% reduction in the write field requirements.

The tilted magnetic media of the present invention may be additionally customized for optimal performance. The tilted C-axis and/or the tilted magnetic anisotropy of the magnetic media of the present invention may be further organized into patterns, for example, unidirectional, circumferential or radial patterns. The orientation of the C-axis and orientation of the tilted magnetic anisotropy are maintained with the well-defined angle and control of directionality as described herein, while organization of the orientations occurs into a pattern.

Figure 11:
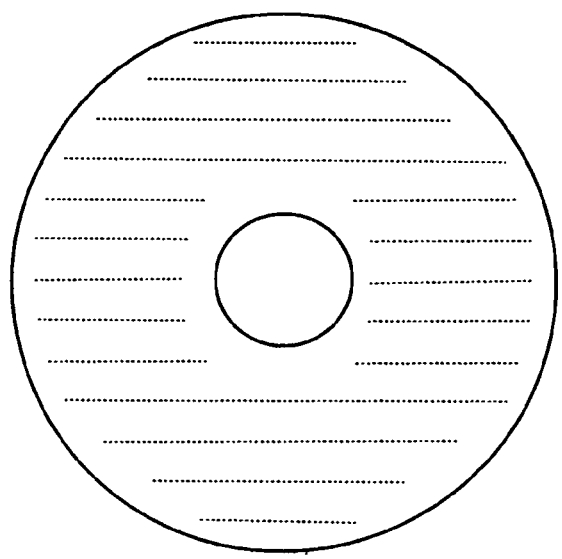
FIG. 11 is a top view illustrating a unidirectional pattern relative to a circular substrate.

A unidirectional pattern, for example as shown in FIG. 11, is defined as when the C-axis of the material (or other feature of interest, e.g. magnetic anisotropy) is oriented generally parallel throughout the material. The material will typically be a layer deposited on the surface of a substrate. A unidirectional pattern is undesirable for substrates that are circular for purposes of rotation, such as hard discs, but may have utility for other substrate shapes.

Circular recording media perform optimally where the characteristics of the media, including those related to magnetic and crystallographic properties, are symmetrical along each cross-section taken though the media, the cross-section being defined by a normal plane along a radius of the circular substrate. This type of symmetry is called azimuthal symmetry. To achieve azimuthal symmetry, any organization of the characteristics of the media is preferred to be into a pattern that is circular in nature, for example a circumferential pattern or a radial pattern.

Figure 12:
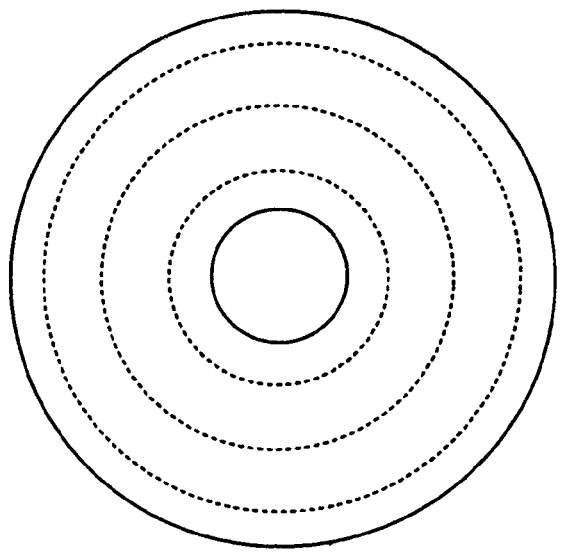
FIG. 12 is a top view illustrating a circumferential pattern relative to a circular substrate.

FIG. 12 illustrates a general circumferential pattern relative to a circular substrate. A circumferential pattern is defined as the organization of a characteristic of the material, for example the C-axis of the material, (or other feature of interest, e.g., easy axis, magnetocrystalline axis, or grains), around a central point or central normal axis.

Figure 13:
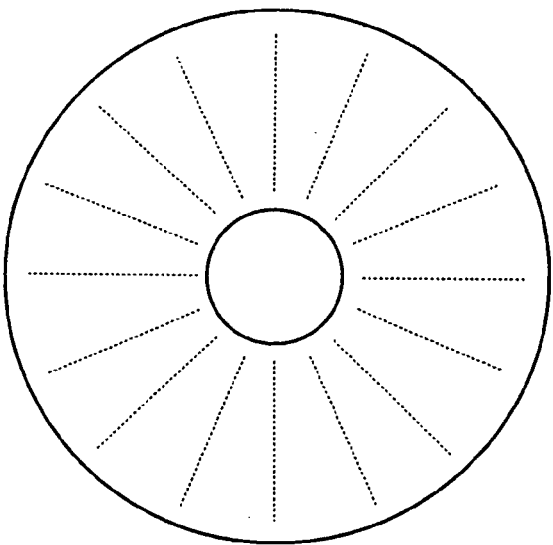
FIG. 13 is a top view illustrating a radial pattern relative to a circular substrate.

FIG. 13 illustrates a general radial pattern on the surface of a circular substrate. A radial pattern is defined as the organization of the tilted C axes (and/or other feature of interest including orientation of the grains, easy axis or magnetocrystalline axis) along radial axes from a central point or central normal axis of the substrate and/or its surface.

The circumferential or radial patterns may be created as disclosed in applications: Ser. No. 10/673,795, "System, Method and Aperture for Oblique Deposition"; and Ser. No. 10/673,746, System, Method and Collimator for Oblique Deposition". The above applications are filed concurrently with the present application and incorporated herein by reference.

Although the present invention has been described with reference to preferred embodiments, workers skilled in the art will recognize that changes may be made in form and detail without departing from the spirit and scope of the invention.

The invention claimed is:

1. A magnetic storage medium comprising:
a substrate having a substrate surface;

a seedlayer structure overlying the substrate surface;
a magnetic material layer on the seedlayer structure, the magnetic material layer having a C-axis tilted at about a first angle with respect to an axis perpendicular to the substrate surface and having a magnetic easy axis oriented at a second angle with respect to the axis perpendicular to the substrate surface; and
a soft magnetic underlayer between the substrate and the seedlayer structure.

2. The magnetic storage medium of claim 1 wherein the seedlayer structure includes crystallographic texture tilted with respect to an axis perpendicular to the substrate surface and acts as a template for epitaxial growth.

3. The magnetic storage medium of claim 1 wherein the first angle is in the range of about 25° to about 55°.

4. The magnetic storage medium of claim 1 wherein the second angle is between about 30° to about 60°.

5. The magnetic storage medium of claim 1 wherein the magnetic material layer is formed of a material with uniaxial anisotropy.

6. The magnetic storage medium of claim 1 wherein the magnetic material layer is formed of a material with coercivity greater than 2000 Oe.

7. The magnetic storage medium of claim 6 wherein the magnetic material layer is formed of a Co alloy.

8. A magnetic storage medium comprising:
a substrate having a substrate surface;
a seedlayer structure overlying the substrate surface; and
a magnetic material layer on the seedlayer structure, the magnetic material layer having a C-axis tilted at a first angle with respect to an axis perpendicular to the substrate surface and having a magnetic easy axis oriented at a second angle with respect to the axis perpendicular to the substrate surface;
wherein the seedlayer structure comprises:
a first seedlayer that defines a tilted grain structure; and
a second seedlayer overlying the first seedlayer that creates a preferred crystallographic texture and provides a template for epitaxial growth of the magnetic material layer.

9. The magnetic storage medium of claim 8 wherein the first seedlayer is formed from Ta.

10. The magnetic storage medium of claim 8 wherein the second seedlayer is formed from Ru.

11. The magnetic storage medium of claim 8 wherein the magnetic material layer is formed from a Co alloy.

12. The magnetic storage medium of claim 1 wherein the magnetic material layer has a columnar structure oriented generally perpendicular to the substrate surface.

13. The magnetic storage medium of claim 1 wherein the magnetic material layer has a columnar structure oriented generally tilted relative to the substrate surface.

14. The magnetic storage medium of claim 1 wherein the C-axis of the magnetic material layer is organized with azimuthal symmetry.

15. A rigid thin film magnetic storage medium for use in a data storage device having a surface normal, the thin film magnetic storage medium comprising:
a substrate;
a magnetic material layer;
a seedlayer structure underlying the magnetic material layer; and
a soft magnetic underlayer between the substrate and the seedlayer structure;
wherein the magnetic material layer comprises:
a C-axis; and
a uniaxial magnetic easy axis tilted with respect to surface normal.

16. The rigid thin film magnetic storage medium of claim 15 wherein the magnetic material layer has a tilted grain structure.

17. The rigid thin film magnetic storage medium of claim 15 wherein the magnetic easy axis is organized with azimuthal symmetry.

18. A rigid thin film magnetic storage medium for use in a data storage device having a surface normal, the thin film magnetic storage medium comprising:
a substrate; a seedlayer structure overlying the substrate; and
a magnetic material layer, the magnetic material layer comprising:
a C-axis, wherein the C-axis is tilted between about 25° and about 55° with respect to surface normal; and
a uniaxial magnetic easy axis tilted and the magnetic easy axis is tilted between about 30° and about 60° with respect to surface normal.

19. The rigid thin film magnetic storage medium of claim 15 wherein the magnetic material layer is grown with epitaxy on the seedlayer structure.

20. A rigid thin film magnetic storage medium for use in a data storage device having a surface normal, the thin film magnetic storage medium comprising:
a substrate;
a magnetic material layer; and
a seedlayer structure underlying the magnetic material layer, the seedlayer structure comprising:
a first seedlayer overlying the substrate that defines a tilted columnar structure; and
a second seedlayer overlying the first seedlayer that defines a tilted crystalline structure and provides a template for expitaxial growth of the magnetic material layer;
wherein the magnetic material layer comprises:
a C-axis; and
a uniaxial magnetic easy axis tilted with respect to surface normal.

21. The rigid thin film magnetic storage medium of claim 20 wherein the first seedlayer is Ta.

22. The rigid thin film magnetic storage medium of claim 20 wherein the second seedlayer is Ru.

23. The rigid thin film magnetic storage medium of claim 20 wherein the magnetic thin film is CoPtCr.

24. The rigid thin film magnetic storage medium of claim 20 and further comprising a soft magnetic underlayer between the substrate and the seedlayer structure.

25. A magnetic storage medium comprising:
a substrate having a substrate surface;
a seedlayer structure overlying the substrate surface, wherein the seedlayer structure includes crystallographic texture tilted with respect to an axis perpendicular to the substrate surface and acts as a template for epitaxial growth; and
a magnetic material layer on the seedlayer structure, the magnetic material layer having a C-axis tilted at about a first angle with respect to an axis perpendicular to the substrate surface and having a magnetic easy axis oriented at a second angle with respect to the axis perpendicular to the substrate surface, wherein the magnetic material layer has a columnar structure oriented at bout 90° to the substrate surface.

* * * * *

UNITED STATES PATENT AND TRADEMARK OFFICE
CERTIFICATE OF CORRECTION

PATENT NO.       : 7,094,483 B2                                          Page 1 of 1
APPLICATION NO.  : 10/674173
DATED            : August 22, 2006
INVENTOR(S)      : Kalman Pelhos et al.

It is certified that error appears in the above-identified patent and that said Letters Patent is hereby corrected as shown below:

Column 11, Line 3, delete "about"

Signed and Sealed this

Thirteenth Day of February, 2007

JON W. DUDAS
*Director of the United States Patent and Trademark Office*